United States Patent [19]
Pleitz

[11] Patent Number: 5,598,325
[45] Date of Patent: Jan. 28, 1997

[54] SERIES COUPLED NON-ISOLATED BIPOLAR TRANSFORMER WITHIN AUTOMOTIVE POWER AMPLIFIER

[76] Inventor: John J. Pleitz, 1750 S. Price, Tempe, Ariz. 85281

[21] Appl. No.: 506,034
[22] Filed: Jul. 24, 1995
[51] Int. Cl.[6] .................................. H02M 3/335
[52] U.S. Cl. .................. 363/24; 363/16; 363/132
[58] Field of Search ......................... 363/17, 24, 25, 363/26, 44, 98, 132, 133; 323/259

[56] References Cited

U.S. PATENT DOCUMENTS 5,422,804  6/1995  Clark ................................ 363/126
5,436,825  7/1995  Wawra et al. ..................... 363/132

Primary Examiner—Stuart N. Hecker
Attorney, Agent, or Firm—Quarles & Brady

[57] ABSTRACT

A bipolar output transformer for use in a automobile audio amplifier. The transformer includes series connected primary and secondary windings and a diode bridge which together step up an input voltage providing an increased bipolar output voltage for efficient interface to the direct coupled power amplifier components.

6 Claims, 3 Drawing Sheets

SERIES COUPLED NON-ISOLATED BIPOLAR TRANSFORMER WITHIN AUTOMOTIVE POWER AMPLIFIER

FIELD OF THE INVENTION

The present invention is related to automobile stereo amplifiers, and in particular, to a series coupled non-isolated bipolar transformer for use in the power supply portion of an automotive power amplifier where ground loop potential between signal source and said amplifier has been affirmatively compensated for, thus reducing the possibility of ground loop noise.

BACKGROUND OF THE INVENTION

Generally speaking, the power supply stage of an audio amplifier must accomplish two distinct goals. First the power supply stage must receive DC input voltage and step that input voltage up to a higher output voltage which is capable of generating additional output power. Second, the power stage must provide bipolar (i.e. positive and negative) rails for use by other amplifier components in amplifying an input audio signal from a relatively low volume to a higher volume.

Most power stages step voltage up from a low voltage level to a high voltage level using a power transformer. A transformer is a device that raises or lowers the voltage of an alternating current. In its simplest form, a transformer is a static electric device consisting of two or more windings, which are mutually coupled. Generally, the winding which is electrically excited is referred to as a primary winding while the winding which is magnetically excited through coupling action is referred to as a secondary winding. By passing alternating current through the primary winding, a magnetic flux is generated which in turn generates a current through, and a voltage across, the secondary winding. By providing the secondary winding with more windings than the primary winding, a relatively low voltage can be increased to a higher value at the output of the transformer.

For the purposes of understanding the present invention, it is important that there are at least two different types of transformers, an isolated primary and secondary transformer and a non-isolated primary and secondary transformer, each of which has advantages and disadvantages. An isolated transformer includes separate primary and secondary electrical circuits which are magnetically coupled via the transformer core. Hence, a primary winding wraps around a portion of the core and a separate secondary winding also wraps a portion of the core. The primary and secondary windings are not electrically coupled.

Referring to FIG. 1, a non-isolated transformer 10, on the other hand, includes primary 12 and series (secondary) 14', 41" windings which form a part of the same electrical circuit. In a step up configuration, the secondary winding 15 includes both the primary winding 12 and the additional series windings 14', 14". In operation, when alternating current is passed through the primary winding 12 magnetic flux is generated in the transformer (not illustrated) which in turn generates current in series windings thus increasing the combined voltage across the secondary winding 15.

In FIG. 1, 12 DC volts are provided to a center point 17 on the transformer 10 via input line 16 which is connected to a 12 volt automobile battery. A switching mechanism 18 alternately connects nodes 21 and 22 to ground via lines 19, 20 respectively so that the voltage at node 17 is alternately impressed across a first 12' and then a second 12" of the primary windings 12. When 12 volts is impressed across the first primary winding 12', the second primary 12" and second series 14" windings operate as a secondary thus providing +36 volts at node 21 which in turn forward biases diode 22 so that node 23 is also at +36 volts.

Similarly, when 12 volts is impressed across the second primary 12" (and node 22 is grounded), the first primary 12' and first series 14" windings operate as a secondary providing +36 volts at node 24 which forward biases diode 25 so that node 23 is again at +36 volts. Small filtering capacitors 26, 27 are provided at the front and back ends of the circuit for filtering purposes.

Generally, the non-isolated primary and secondary transformer is advantageous for the same reasons that an isolated winding transformer is disadvantageous and visa versa. For example, because the non-isolated transformer's secondary winding includes the primary winding, the combined number of windings to step voltage up a specific quantum is typically less with the non-isolated transformer, as opposed to an isolated transformer. In addition, because less windings are required with a non-isolated transformer, relatively less power is lost in the windings and usually a smaller transformer core can be used. As a corollary, given a specific core size with a non-isolated transformer winding configuration, greater core surface area can be exposed for heat dissipating purposes.

Despite all of the above mentioned advantages associated with a non-isolated transformer, isolated non-series transformers are still preferred for many applications. One reason isolated transformers are preferred is their inherent ability to provide an electrical "open circuit" between their primary and secondary windings. This open circuit eliminates ground loop currents which cannot easily be eliminated using a non-isolated transformer alone.

Ground currents are caused when two or more points in an electrical system that are nominally at ground potential are connected by a conducting path such that the two point are not at the same potential. When this happens, a current is caused to flow between the two nominal ground points. In an audio system including an amplifier, ground loop potential can turn into undesirable ground loop noise and distort an audio signal as the amplifier amplifies the noise. A non-isolated transformer does not electrically separate primary and secondary coils and therefore, provides a ground loop circuit which can result in ground loop noise.

In an automobile power amplifier, ground loop potential can be a significant problem. In an automobile, the automobile chassis is typically connected to battery ground so that any component connected to the chassis is theoretically connected to a unipotential ground point. In reality, however, because automobile stereo components will typically be connected to ground through special ground wires characterized by different lengths and resistances, the separate grounding points may have slightly different potentials. Thus, ground loop potential problems are common in automobiles. For this reason, despite their size and associated costs, isolated transformers have been the standard in the automotive amplifier industry.

Recently, however, the industry has approached the ground loop potential problem from a different perspective. Instead of eliminating ground loop currents, the potential has been affirmatively compensated so that, in fact, differences in ground potential are rejected by the amplifier. Methods of affirmatively compensating for ground loop potential currently exist in the field and are well known.

Once a system has been designed wherein ground loop potential has been accounted for and proper system gain is achieved, it is necessary to obtain bipolar supply rails so as to allow straight forward implementation of a direct coupled power amplifier. Where isolated transformers have been used in the automobile audio industry, bipolar output has been achieved by employing a center tap output configuration including a full wave bridge rectifier. This type of configuration is well known in the industry.

However, the industry has yet to achieve bipolar output from a non-isolated transformer in an acceptable manner. Referring again to FIG. 1, typical automotive series connected non-isolated transformers provide a stepped up unipolar output and convert that unipolar output to bipolar output by passing the unipolar output through a large capacitor stage 30. While this solution provides ineffective bipolar rails, one of the advantages of the non-isolated transformer, its smaller relative size, is mitigated as the capacitor stage typically includes large capacitor components. Large capacitors are especially important for adequate low frequency response. In addition, even where large capacitors are used, low frequency response will typically be only acceptable at best.

Other output stages capable of providing bipolar output (with a unipolar supply) having acceptable low frequency response have been developed. However, these other output stages generally require additional hardware which increases amplifier costs considerably.

In light of the problems associated with providing positive and negative rails using a non-isolated transformer, the industry has opted to use isolated primary and secondary transformers so as to achieve bipolar rails and therefore good low frequency response without a costly output stage, this at the expense of increased amplifier size and increased transformer costs.

Thus, it would be advantageous to have a transformer stage for use with a direct coupled automotive audio amplifier which takes advantage of the benefits associated with a non-isolated series connected bipolar transformer (i.e. higher output/size ratio and relatively low cost) which can provide a bipolar output having superb low frequency response without a large or costly output stage.

SUMMARY OF THE INVENTION

The present invention includes a power stage configuration including a conversion means for converting a direct voltage to two out of phase alternating pulse trains provided at first and second input nodes, a ground node, first and second primary windings having identical numbers of turns, the first primary winding connected between the first input node and the ground node and the second primary winding connected between the second input node and the ground node, a full wave diode bridge rectifier having upper and lower input nodes and positive and negative output nodes. The stage also includes first and second series windings, the first series winding connected between the first input node and the upper input node and the second series winding connected between the second input node and the lower input node, and a positive rail connected to the positive output node and a negative rail connected to the negative output node.

A primary object of the present invention is to provide a relatively small bipolar transformer for use in an automobile audio amplifier. By using a diode bridge rectifier in conjunction with a transformer configured as described above, a minimal number of primary and series windings and a correspondingly small transformer core can be used to provide positive and negative voltage rails. In fact, given the same number of windings, the present configuration can increase output by as much as 50% over conventional transformers.

Another object of the invention is to provide positive and negative voltage rails without requiring additional relatively large output circuitry for converting a unipolar output voltage to bipolar. The diode bridge used in the present invention is small relative to the space required to house capacitors sufficient to provide adequate low frequency response output. Thus, not only is the size of the transformer minimized, but also the size of other components required to provide the bipolar output is minimized.

Yet another object of the invention is to limit the cost of a bipolar output transformer. Because a smaller core can be used with the present invention and less windings are required to step up an input voltage, and because a simple diode bridge rectifier can be employed, the cost of the present automobile audio amplifier power supply stage is minimized.

These and still other objects and advantages of the invention will become apparent from the description which follows. In the description, the preferred embodiments will be described with reference to the accompanying drawings. These embodiments do not represent the full scope of the invention. Rather, reference should be made to the claims herein for interpreting the full scope of the invention.

DESCRIPTION OF THE PREFERRED EMBODIMENT

Figure 1:
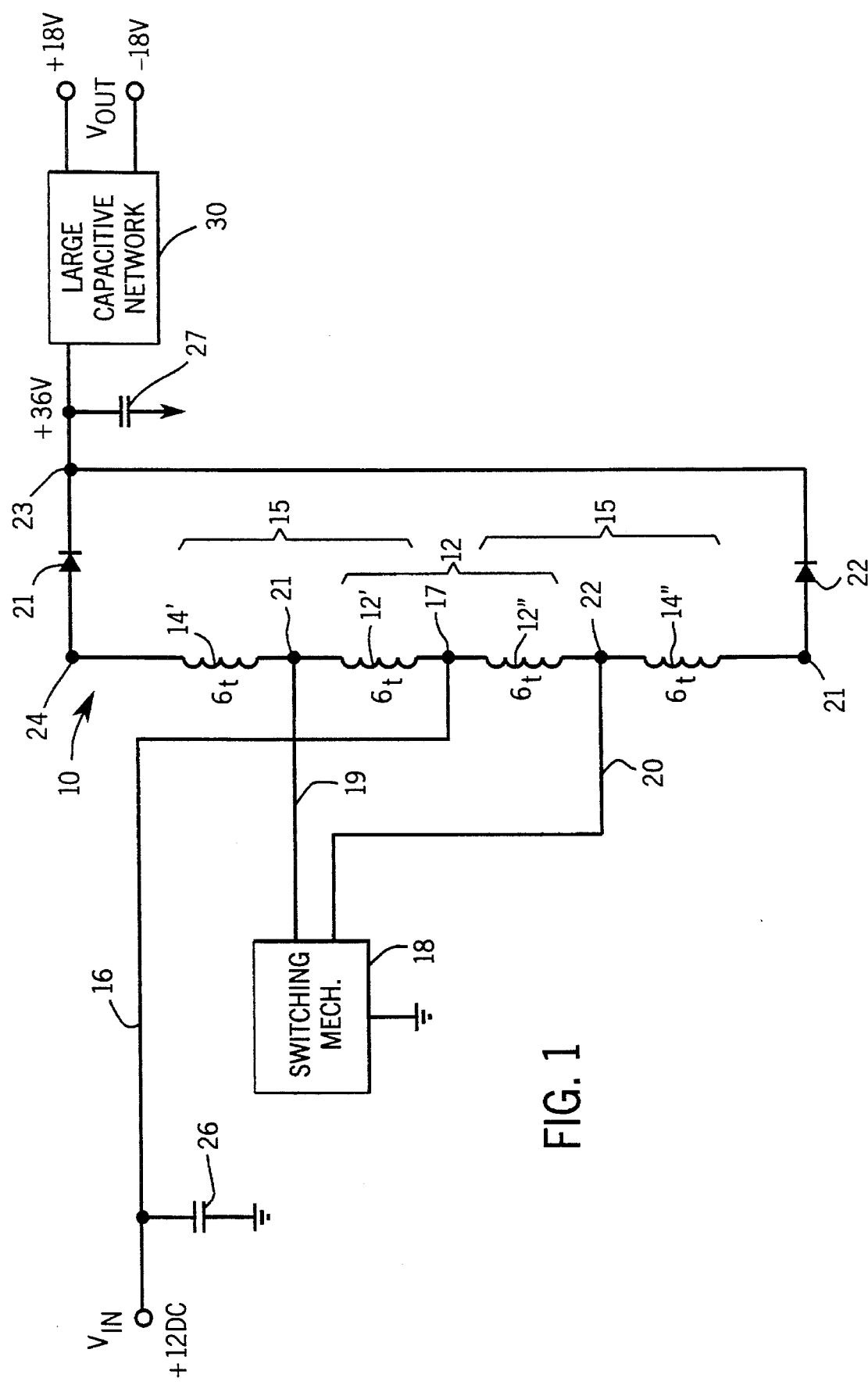
FIG. 1 is a schematic of a prior art unipolar non-isolated series connected transformer.
Figure 2:
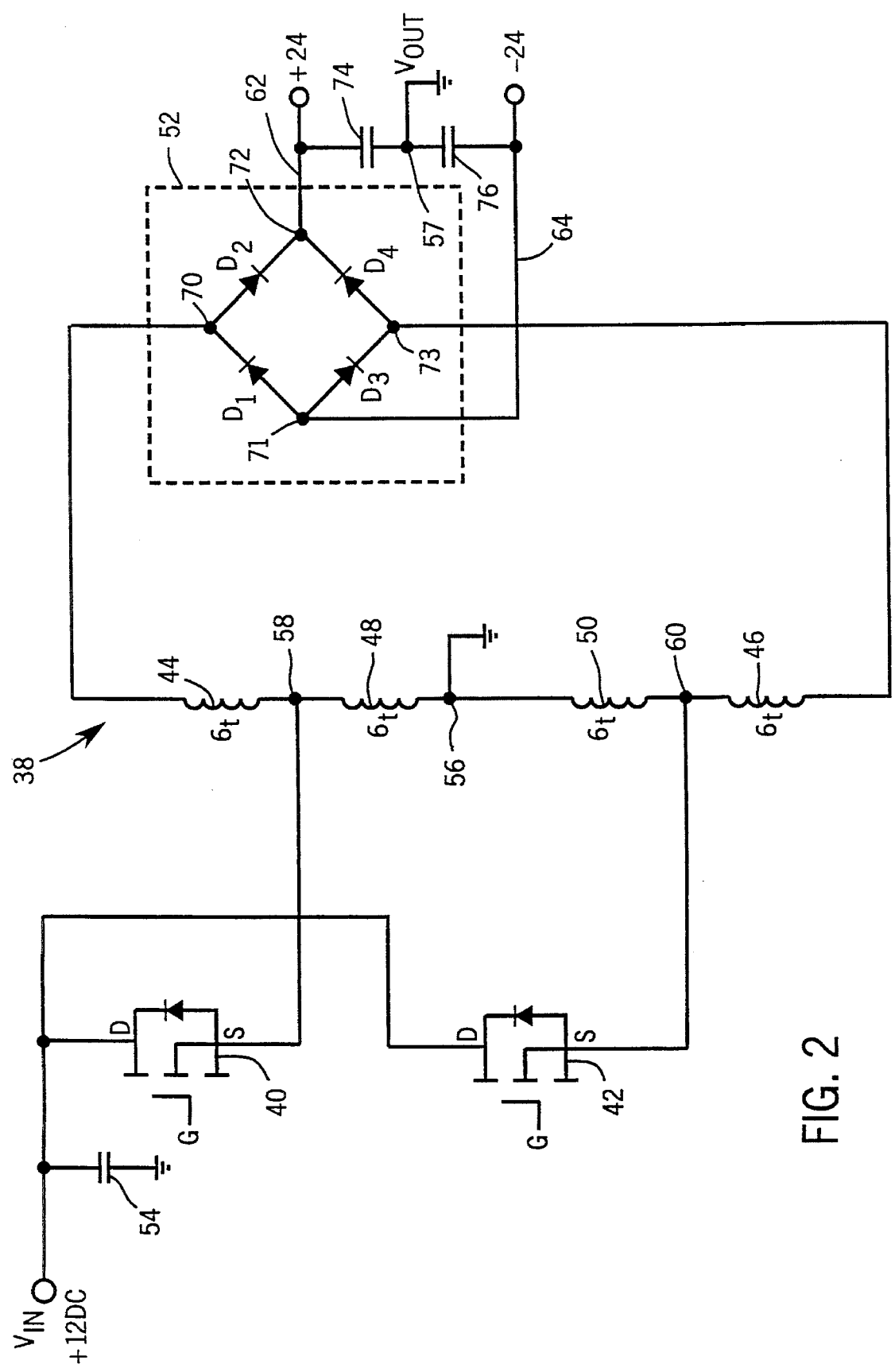
FIG. 2 is a circuit diagram showing the major components of the inventive series coupled non-isolated bipolar transformer.

Referring to FIG. 2, the inventive bipolar transformer 38 for use in an automotive audio amplifier includes upper and lower field effect transistors (FETs) 40, 42, upper and lower series windings 44, 46, upper and lower primary windings 48, 50, a diode bridge rectifier 52 including four diodes D1–D4, and a plurality of other components connected as described below.

Input voltage $V_{in}$ is provided by a simple connection to an automobile battery which supplies 12 DC volts to the transformer 38. A first filter capacitor 54 connects the 12 volts source to ground thus limiting high frequency source disturbances. The drain D of each FET is connected to the input voltage while the gates G are connected to an oscillating triggering mechanism (not shown).

Various oscillating triggering mechanisms are well known in the art and thus will not be explained here in detail. Generally, however, either a pulse width modulating inverter or a Royer type self-oscillating single or double transformer could be used to trigger the FETs as described below.

All of the primary 48, 50 and series windings 44, 46 are connected in series, the two primary windings 48, 50 being adjacent and each of the two series windings connected on a different side of the primaries 48, 50. In a preferred embodiment each of the primary and series windings have the same number of turns (e.g. 6 turns). A node 56 between the two primary windings is grounded while upper and lower input junctions 58, 60, between adjacent primary and a series windings are connected to the sources of the FETs, the upper input junction 58 connected to the upper FET 40 and the lower junction 60 connected to the lower FET 42.

The four diodes D1-D4 in the diode bridge rectifier 52 are connected so as to define upper and lower input nodes 70, 73, and positive and negative output nodes 72, 71 respectively. Diode bridges of this type are also well known in the art and thus, will not be explained in great detail. The bridge 52 receives AC voltage and converts that voltage into bipolar DC voltages which are output on positive and negative DC rails 62, 64 respectively. The positive and negative rails 62, 64 are connected to a ground 57 via second and third filter capacitors 74, 76 respectively, the capacitors 74, 76 tending to stiffen the DC output voltages thus eliminating ripple or sudden voltage changes.

Figure 3:
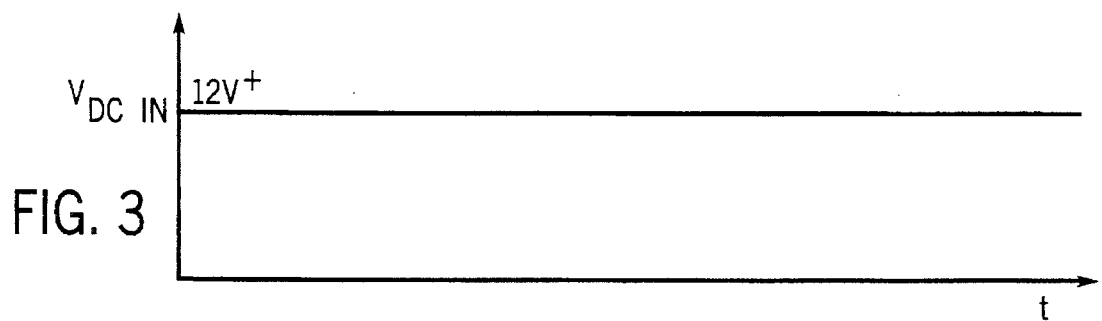
FIG. 3 is a graph showing a direct voltage input.
Figure 4:
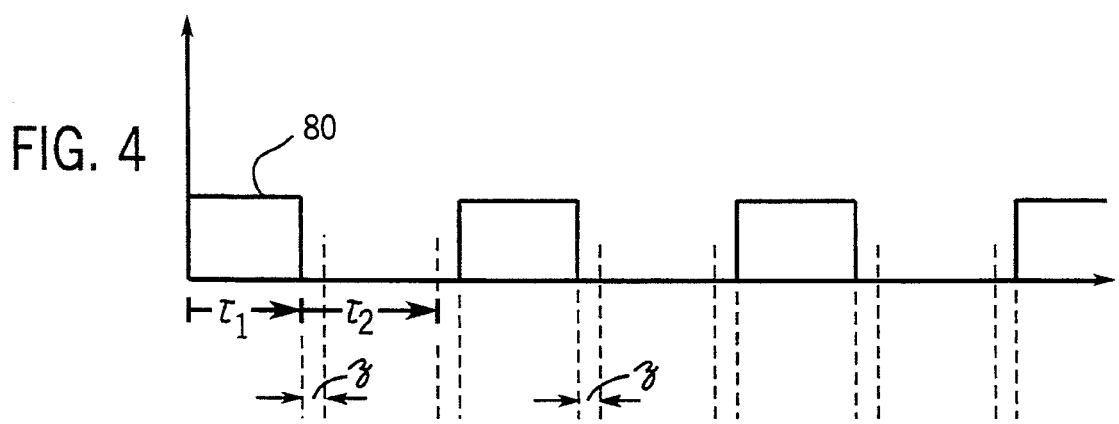
FIG. 4 is a graph showing a trigger signal used with the present invention.
Figure 5:
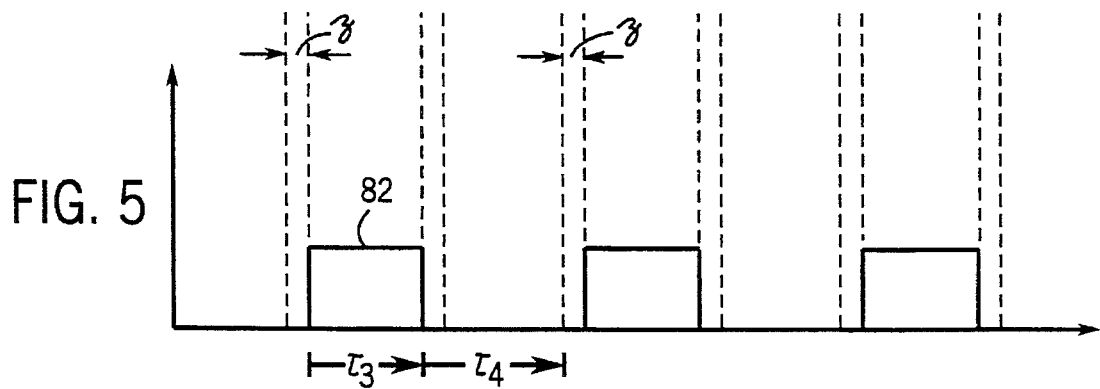
FIG. 5 is a graph similar to the one shown in FIG. 4.

Referring also to FIGS. 3–5, each of the FETs 40, 42 receives the 12 volt DC input voltage $V_{DCin}$ at drains D. In addition, the upper FET 40 receives a first pulse train 80 which is on for a period $\tau_1$ and then off for a period $\tau_2$ and then on again for $\tau_1$, oscillating between on and off states regularly. Similarly, the lower FET 42 received a second pulse train 82 which oscillates between on and off $\tau_3$ and $\tau_4$ states respectively, where ideally $\tau_3=\tau_1$ and $\tau_4=\tau_2$. Importantly, the off states $\tau_2$, $\tau_4$ are of a longer duration than the on states $\tau_1$, $\tau_3$ and the two pulse trains are dramatically out of phase so that there are short non-conducting delay periods $\zeta$ between the times when one pulse train goes off and the other train goes on. These delay periods $\zeta$ ensure that both of the FETs are not conducting between drain and source at the same time which could cause undesirable harmonic components in the DC output voltages.

The triggering pulse trains 80, 82 are generated so as to provide a conducting path between the drain and source terminals of their respective FETs 40, 42, thus generating voltage pulse trains at upper and lower input junctions 58, 60 which substantially mirror the trigger pulses 80, 82, but which have 12 volts on maximum amplitudes. Thus, each FET 40, 42 operates as an amplifier.

Referring still to FIG. 2, assuming that the upper FET 40 is conducting from drain to source, 12 volts will be impressed at upper input junction 58 across primary winding 48. Current passing through winding 48 will induce magnetic flux in the transformer core which will in turn generate a current in the upper series winding 44 as well as the lower primary and series windings 50, 46. Thus, the instantaneous voltage at node 70 will be +24 volts (i.e. 12 volts impressed across upper primary winding 48 and 12 volts magnetically generated in upper series winding 44). In addition, as current is draws through lower windings 50, 46, the instantaneous voltage at node 73 will become 24 volts (i.e. 12 volts magnetically generated across each of the two lower windings). However, because current in the lower windings 46, 50 travels upwardly to ground node 56, node 73 is a negative 24 volts at this point.

With nodes 70 and 73 instantaneously positive and negative respectively, diodes D2 and D3 will conduct so that nodes 72 and 71 will also be at +24 volts and −24 volts respectively. As rails 62, 64 are connected to nodes 72, 71, they will be instantaneously positive and negative as desired.

Next, assume that the first pulse train 80 (see FIG. 4) driving upper FET 40 is off and the second train 82 (see FIG. 5) driving the lower FET 42 is on. In this case, 12 volts are impressed across the lower primary winding 50 causing current to flow therethrough. The current generates magnetic flux in the core which in turn generates currents through the other three windings 44, 46, 48 again generating diametrically different voltages at nodes 70 and 73. However, as node 60 is instantaneously positive 12 volts with respect to ground node 56, current is induced in the windings 44, 46, 48, 50 which travels from node 70 to node 73. Thus, node 73 is instantaneously +24 volts (i.e. 12 volts impressed across winding 50 and 12 volts magnetically generated across series winding 46) and node 70 is instantaneously −24 volts (i.e. −12 volts magnetically generated across each of the upper windings 44, 48). In this case, diodes D1 and D4 are biased on so that, again, node 72 and output rail 62 are at +24 volts and node 71 and output rail 64 are at −24 volts.

Referring again to FIGS. 2, 4 and 5, it should be appreciated that each time either of the pulse trains 80, 82 is on, the outputs on rails 62, 64 are +24 volts and −24 volts respectively. By limiting the delay periods $\zeta$ between pulses in trains 80 and 82 and providing second and third filter capacitors 74, 76, the output voltages on rails 62, 64 can be maintained at approximately ±24 volts in steady state.

Importantly, as explained above, the series winding configuration used in the present invention is only intended to be used with an amplifier that includes separate circuitry to affirmatively ensure that all ground potentials within an automobile audio system are rejected by the amplifier circuitry thus affirmatively eliminating ground loop associated noise. This circuitry is well known in the art.

When used along with ground loop limiting circuitry, the present series coupled bipolar transformer efficiently achieves high voltage output with exceptional low frequency response using a relatively small transformer core, minimal windings and inexpensive, small and minimal circuitry to provide bipolar output.

Although the preferred embodiment of the invention has been described above, the invention claimed is not so restricted. For example, while the preferred embodiment has been described as being driven by two field effect transistors, clearly any type of switching mechanism which could create a 12 volt pulse train as described above for input to the upper and lower input junctions 58, 60 could be used. In addition, while the primary and series windings have been described as having identical numbers of turns, it is not necessary that these numbers be identical. For example, the primary windings may each have 6 turns while each of the secondary windings has 12 turns.

Thus, the invention is not limited by the specific description above, rather it should be judged by the claims which follow.

I claim:

1. A power stage for use in an automobile audio amplifier, the amplifier including circuitry for affirmatively compensating for ground loop potential, so as to reject ground loop induced potentials, the automobile providing a DC voltage source, the power stage comprising:

a conversion means for converting the direct voltage to two out of phase alternating pulse trains provided at first and second input nodes;

a ground connected to a ground node;

first and second primary windings having identical numbers of turns, the first primary winding connected between the first input node and the ground node and the second primary winding connected between the second input and the ground node;

a full wave diode bridge rectifier having upper and lower input nodes and positive and negative output nodes;

first and second series windings, said first series winding connected between the first input node and the upper input node and the second series winding connected between the second input node and the lower input node; and a positive rail connected to the positive output node and a negative rail connected to the negative output node.

2. The power stage of claim 1 wherein the series and primary windings each include identical numbers of turns.

3. The power stage of claim 1 further including first and second identical capacitors, the first capacitor connected between the positive rail and the ground node and the second capacitor connected between the negative rail and the ground node.

4. The power stage as recited in claim 1 wherein the two alternating pulse trains are supplied by first and second field effect transistors, the drain terminal of each transistor connected to the DC voltage source and the sources of the first and second transistors connected to the first and second input nodes respectively, triggering signals being alternately applied to the gates of the transistors.

5. The power stage of claim 4 wherein a Royer type self-oscillating transformer circuit is used to generate the triggering signals.

6. A power stage for use in an automobile audio amplifier, the amplifier including circuitry for affirmatively compensating for ground loop potential so as to reject ground loop induced potentials, the automobile providing a DC voltage source, the power supply stage comprising:

a triggering means for providing first and second triggering pulse trains, at any instant each of the pulse trains either being on or off and the first and second pulse trains never being on at the same instant;

first and second field effect transistors, the drain terminal of each transistor connected to the DC voltage source, the transistors connected to the triggering means by their gate terminal so as to receive the first and second triggering signals respectively, and the sources of the first and second transistors connected to first and second input nodes respectively;

a ground connected to a ground node;

first and second primary windings having identical numbers of turns, the first primary winding connected between the first input node and the ground node and the second primary winding connected between the second input node and the ground node;

a full wave diode bridge rectifier having upper and lower inputs nodes and positive and negative output nodes, the diode bridge including four identical diodes, a first diode having an anode connected to the upper input node and a cathode connected to the positive output node, a second diode having an anode connected to the negative output node and a cathode connected to the upper input node, a third diode having an anode connected to the negative output node and a cathode connected to the lower input node, and a four diode having an anode connected to the lower input node and a cathode connected to the positive output node;

first and second series windings, said first series winding connected between the first input node and the upper input node and the second series winding connected between the second input node and the lower input node, the first and second series windings each having identical numbers of turns and having the same number of turns as the primary winding;

a positive rail connected to the positive output node and a negative rail connected to the negative output node; and first and second filtering capacitors, the first filtering capacitor connected between the positive rail and the ground node and the second filtering capacitor connected between the ground node and the negative rail.

\* \* \* \* \*